US012669888B2

(12) United States Patent
Liu et al.

(10) Patent No.: US 12,669,888 B2
(45) Date of Patent: Jun. 30, 2026

(54) METHOD FOR MATCHING TOUCH POINTS, A METHOD FOR OBTAINING A TOUCH TRAJECTORY, AND PRODUCTS

(71) Applicant: SHENZHEN HITEVISION TECHNOLOGY CO., LTD., Shenzhen (CN)

(72) Inventors: Jigui Liu, Shenzhen (CN); Minghua Zhang, Shenzhen (CN); Shuai Wang, Shenzhen (CN); Xiezeng Xu, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/876,172

(22) PCT Filed: Dec. 12, 2022

(86) PCT No.: PCT/CN2022/138423
§ 371 (c)(1),
(2) Date: Dec. 17, 2024

(87) PCT Pub. No.: WO2024/087342
PCT Pub. Date: May 2, 2024

(65) Prior Publication Data
US 2025/0370559 A1 Dec. 4, 2025

(30) Foreign Application Priority Data
Oct. 27, 2022 (CN) .......................... 202211330282.2

(51) Int. Cl.
*G06F 3/041* (2006.01)
(52) U.S. Cl.
CPC .. *G06F 3/0416* (2013.01); *G06F 2203/04104* (2013.01)

(58) Field of Classification Search
CPC ..................... G06F 3/0416; G06F 2203/04104
See application file for complete search history.

(56) References Cited
U.S. PATENT DOCUMENTS 8,334,846 B2 * 12/2012 Westerman ........... G06F 3/0446
345/173
8,773,377 B2 * 7/2014 Zhao ..................... G06F 3/0488
345/173
(Continued)

FOREIGN PATENT DOCUMENTS

CN 102096530 A 6/2011
CN 103425300 A 12/2013
(Continued)

OTHER PUBLICATIONS

The International search report for PCT Application No. PCT/CN2022/138423, dated Jun. 13, 2023, 5 pages.
(Continued)

*Primary Examiner* — Liliana Cerullo
(74) *Attorney, Agent, or Firm* — East IP P.C.

(57) ABSTRACT

Provided a method for matching touch points, a method for obtaining a touch trajectory, and products. The method for matching touch points includes: obtaining at least one touch point sequence, where the at least one touch point sequence including a first touch point sequence; obtaining at least one predicted point sequence, where the at least one predicted point sequence includes a first predicted point sequence which includes Q predicted points associated with a first actual touch point, the first actual touch point being one of the actual touch points, and at least one of the actual touch points being in a one-to-one correspondence with the at least one predicted point sequence; and matching the actual touch points in the at least one touch point sequence with the predicted points in the at least one predicted point sequence
(Continued)

by a deferred-acceptance algorithm to obtain a matching result.

19 Claims, 7 Drawing Sheets

(56) References Cited

U.S. PATENT DOCUMENTS

| | | | |
|---|---|---|---|
| 2010/0097342 A1 | 4/2010 | Simmons et al. | |
| 2013/0154983 A1* | 6/2013 | Christiansson | G06F 3/0446 |
| | | | 345/173 |
| 2015/0355778 A1* | 12/2015 | Kim | G06F 3/0416 |
| | | | 345/173 |
| 2016/0098148 A1* | 4/2016 | Gandra | G06T 1/20 |
| | | | 345/173 |
| 2016/0275172 A1* | 9/2016 | Noma | G06F 16/24575 |
| 2016/0357429 A1* | 12/2016 | Nilo | G06F 3/04883 |
| 2017/0344802 A1* | 11/2017 | Zhang | G06V 40/1365 |
| 2018/0188938 A1 | 7/2018 | Deselaers et al. | |
| 2022/0230102 A1* | 7/2022 | Lee | G06Q 10/063118 |
| 2025/0217134 A1* | 7/2025 | O'Brien | G06F 8/65 |

FOREIGN PATENT DOCUMENTS

| | | |
|---|---|---|
| CN | 103605442 A | 2/2014 |
| CN | 105955525 A | 9/2016 |
| CN | 105 97 51 19 B | 11/2018 |

OTHER PUBLICATIONS

The extended European search report dated Sep. 25, 2025 for European application No. 22963320.1, 6 pages.

* cited by examiner obtain at least one touch point sequence that comprises a first touch point sequence, the first touch point sequence comprising at least one effective actual touch point which is a point of a plurality of actual touch points detected at moment T + 1 and is associated with a first predicted point, the first predicted point being a point predicted for the moment T + 1 according to a first touch trajectory, the first touch trajectory being a trajectory generated at moment T and being one of at least one touch trajectory, and the at least one touch trajectory being in a one-to-one correspondence with the at least one touch point sequence, where T is an integer

S101 obtain at least one predicted point sequence that comprises a first predicted point sequence comprising Q predicted points, the Q predicted points being associated with a first actual touch point, the first actual touch point being one of the plurality of actual touch points, and at least one of the actual touch points being in a one-to-one correspondence with the at least one predicted point sequence, where Q is a non-negative integer

S102 match the actual touch points in the at least one touch point sequence with the predicted points in the at least one predicted point sequence by a deferred-acceptance algorithm to obtain a matching result.

$$\begin{bmatrix} D1a & D1b & D1c & D1d & D1e & D1f & D1g \\ D2a & D2b & D2c & D2d & D2e & D2f & D2g \\ D3a & D3b & D3c & D3d & D3e & D3f & D3g \\ D4a & D4b & D4c & D4d & D4e & D4f & D4g \\ D5a & D5b & D5c & D5d & D5e & D5f & D5g \\ D6a & D6b & D6c & D6d & D6e & D6f & D6g \end{bmatrix}$$

S901 obtain the unmatched touch point at the moment T+1

S902 obtain at least one actual touch point collected at each of the moments T+2 to T+N

S903 determine a newly added target actual touch point that is matched with the unmatched touch point of at least one actual touch point collected at each of moments T+2 to T+N by a deferred-acceptance algorithm

S904 arrange the predicted points whose Euclidean distances are less than or equal to the distance threshold in ascending order of the Euclidean distances to obtain the first predicted point sequence

FIG. 9

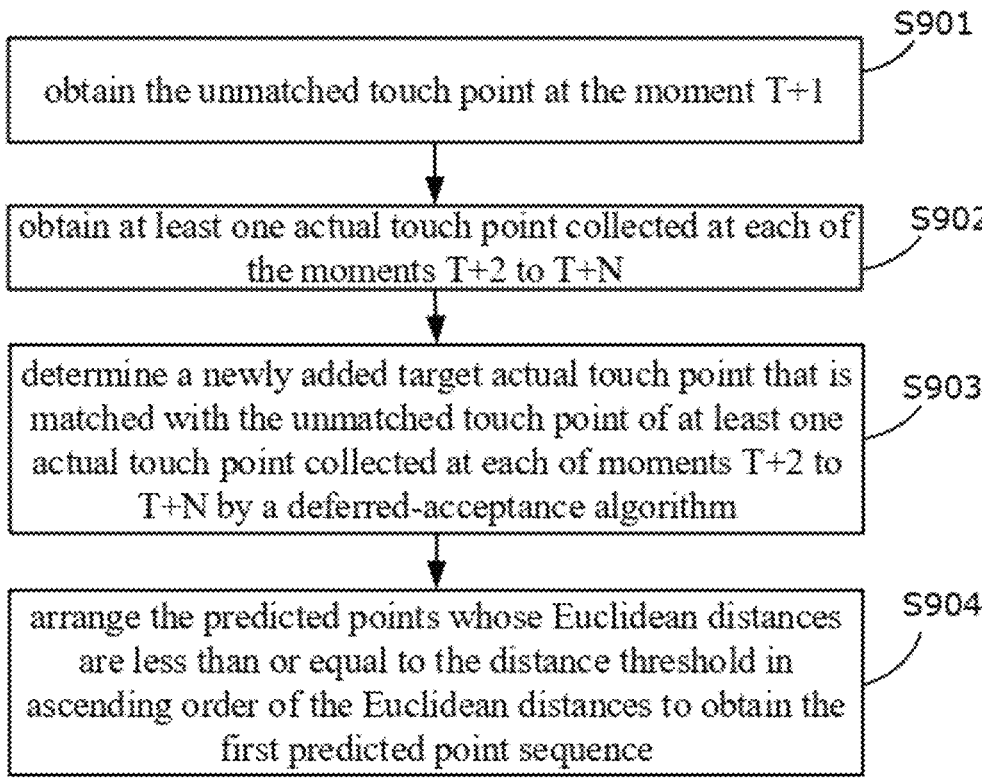

Memory

Computer program

Processor

METHOD FOR MATCHING TOUCH POINTS, A METHOD FOR OBTAINING A TOUCH TRAJECTORY, AND PRODUCTS

CROSS-REFERENCE TO RELATED APPLICATION

This application is a National Stage of International Application No. PCT/CN2022/138423 filed on Dec. 12, 2022, which claims priority to Chinese Patent Application No. 202211330282.2 filed on Oct. 27, 2022, both of which are hereby incorporated by reference in their entireties.

TECHNICAL FIELD

The present application relates to the technical field of touch control, and in particular to a method for matching touch points, a method for obtaining a touch trajectory, and products.

BACKGROUND

With the progress of science and technology, the application of touch control technology (touch technology) has become more and more common. Generally, touch control technology is applied on the big screen of the conference, the touch blackboard of the school and other touch screen devices. For example, the conference host can operate and demonstrate the content to be shown by touching the big screen; then, teachers or students can write by touching the touch blackboard in the classroom. When the user operates the touch screen device, it is required the touch screen device to identify the touch point that the user touches, and generate the touch trajectory, so as to determine the user's touch operation in order to respond.

The traditional way of acquiring the touch trajectory is to identify the touch points on the previous and next frames and associate the touch points on the previous and next frames that are closest to each other, thereby generating the touch trajectory through the touch points that are associated with each other on a plurality of frames.

However, during the usage of a touch screen device, there are sometimes situations where a plurality of people are writing at the same time. For example, a plurality of participants may touch the same display interface at the same time; for another example, a teacher and a student may also touch the same display interface at the same time. In the traditional process of generating touch trajectories, it is impossible to distinguish the touch points of different users, which may lead to inaccurate association of touch points in previous and next frames. For example, the touch point of the teacher in the current frame will be associated with the touch point of the student in the next frame. This will cause the generated touch trajectory to be inaccurate, making it impossible to accurately judge the user operation, and it is impossible to correctly respond to the user operation, affecting the user experience.

SUMMARY

Embodiments of the present application provide a touch point matching method, a method and device for obtaining touch trajectories, an electronic device, a computer-readable storage medium, and a computer program product, which can improve the accuracy of touch point matching and thus enhance the accuracy of generating touch trajectories during touch.

In a first aspect, embodiments of the present application provide a method for matching touch points including: obtaining at least one touch point sequence that includes a first touch point sequence including at least one effective actual touch point which is a point in a plurality of actual touch points detected at moment T+1 and is associated with a first predicted point, the first predicted point being a point predicted for the moment T+1 according to a first touch trajectory, the first touch trajectory being a trajectory generated at moment T and being one of at least one touch trajectory, and the at least one touch trajectory being in a one-to-one correspondence with the at least one touch point sequence, where T is an integer; obtaining at least one predicted point sequence that includes a first predicted point sequence including Q predicted points, the Q predicted points being associated with a first actual touch point, the first actual touch point being one of the plurality of actual touch points, and at least one of the actual touch points being in a one-to-one correspondence with the at least one predicted point sequence, where Q is a non-negative integer; and matching the actual touch points in the at least one touch point sequence with the predicted points in the at least one predicted point sequence by a deferred-acceptance algorithm to obtain a matching result.

In a second aspect, a method for obtaining a touch trajectory is provided, the method including: obtaining a touch trajectory generated at T moment; determining a target actual touch point that is matched with the touch trajectory by using the method for matching touch points described above, where the target actual touch point is a point of the actual touch points detected at moment T+1; and generating an updated touch trajectory based on the touch trajectory and the target actual touch points.

In a third aspect, a computer device is provided, including a processor, a memory, and a computer program stored in the memory and runnable on the processor, the computer program, when executed by the processor, is to implement the method according to any one of the first aspect and the second aspect.

In a fourth aspect, a computer-readable storage medium is provided, the computer-readable storage medium stores a computer program, which implements the methods any one of the first aspect and the second aspect.

In a fifth aspect, a computer program product including instructions is provided, which enables the computer to execute the steps of any one of the methods of the technical solutions of the first aspect or the second aspect.

It can be understood that the beneficial effects of the second, third, fourth and fifth aspects mentioned above can be found in the relevant descriptions of the first and second aspects mentioned above, and will not be repeated here.

BRIEF DESCRIPTION OF THE DRAWINGS

In order to more clearly illustrate the technical solutions in the embodiments of the present application, the accompanying drawings to be used in the description of the embodiments will be briefly introduced below, and it will be obvious that the accompanying drawings in the following description are only some of the embodiments of the present application, and other accompanying drawings can be obtained according to these drawings for the people of ordinary skill in the field without putting forth creative labor.

FIG. 1 is a flowchart of a method for matching touch points provided in an embodiment of the present application;

FIG. 9 is a flowchart of a method for verifying unmatched touch points provided in embodiments of the present application;

FIG. 10 is a schematic view of a verification result of an example of verifying unmatched touch points provided by embodiments of the present application;

DETAILED DESCRIPTION

Figure 2:
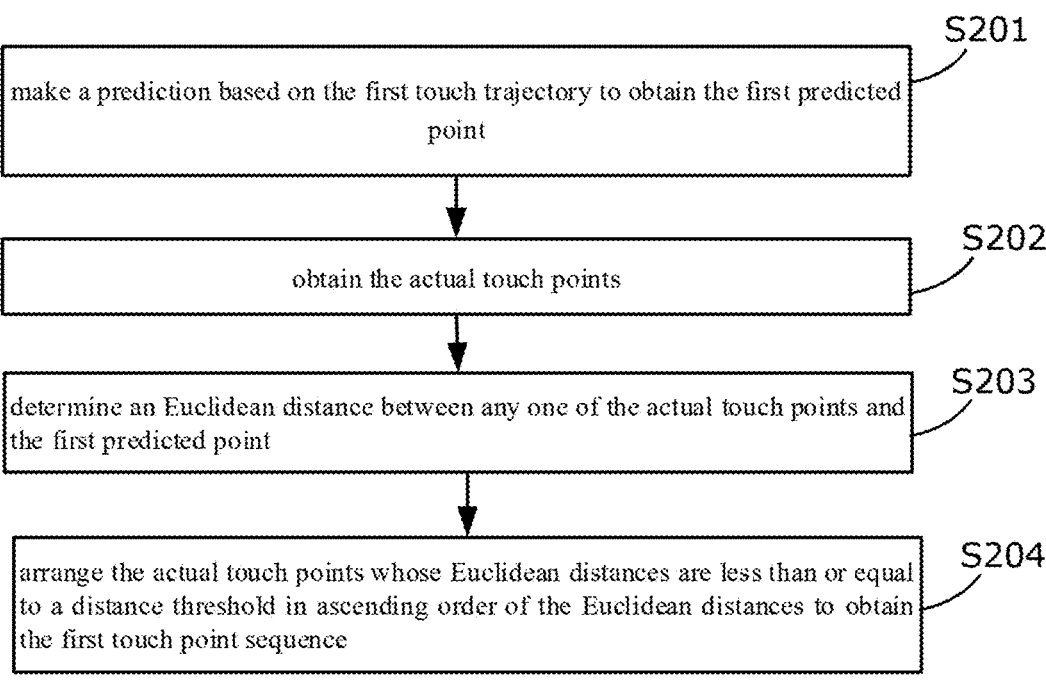
FIG. 2 is a flowchart of an example of a process for obtaining a first touch point sequence provided in embodiments of the present application.

In order to make the purpose, technical solutions and advantages of the present application clearer, the following will describe the embodiments of the present application in further detail in conjunction with the accompanying drawings.

It should be understood that the term "plurality" as used herein refers to two or more. In the description of the present application, unless otherwise specified, "/" means or, for example, A/B may mean either A or B. "and/or" herein is merely a description of the associated relationship of the associated objects, indicating that three kinds of relationships may exist, for example, A and/or B, may mean: A alone, both A and B, and B alone/or B, may denote: A alone, both A and B, and B alone. In addition, in order to facilitate a clear description of the technical solution of the present application, words such as "first" and "second" are used to differentiate between the same or similar items having essentially the same functions and roles. Those skilled in the art may understand that the words "first" and "second" do not limit the number or the order of execution, and the words "first" and "second" are also used to distinguish between the same or similar items having basically the same function and function. The words "first", "second", etc. do not limit the number or order of performance, and the words "first", "second", etc. do not qualify as necessarily different.

Before explaining the embodiments of the present application in detail, the application scenarios of the embodiments of the present application are described.

With the advancement of science and technology, the application of touch control technology (touch technology) has become more and more common. Usually, touch technology is applied to touch screen devices such as large screens in conferences and touch blackboards in schools. For example, the conference host can operate and demonstrate the content to be presented by touching the large screen; for another example, teachers or students can write by touching the touch blackboard placed in the classroom. When the user operates the touch screen device, the touch screen device needs to identify the touch point touched by the user and generate a touch trajectory, so as to determine the user's touch operation in order to respond.

The traditional way of acquiring the touch trajectory is to identify the touch points on the previous and next frames and associate the touch points on the previous and next frames that are closest to each other, thereby generating the touch trajectory through the touch points that are associated with each other on a plurality of frames.

However, when using a touch screen device, there are sometimes situations where a plurality of people are writing at the same time. For example, a plurality of participants may touch the same display interface at the same time; for example, a teacher and a student may also touch the same display interface at the same time. In the traditional process of generating touch trajectories, it is impossible to distinguish the touch points of different users, which may lead to inaccurate association of touch points in previous and next frames. For example, the touch point of the teacher in the current frame will be associated with the touch point of the student in the next frame. This will cause the generated touch trajectory to be inaccurate, making it impossible to accurately judge the user operation, and it is impossible to correctly respond to the user operation, affecting the user experience.

To this end, embodiments of the present application provide a touch point matching method that first obtains a touch point sequence constituted by actual touch points with a high degree of correlation with the predicted points, then obtains a predicted point sequence constituted by predicted points with a high degree of correlation with the actual touch points, and then matches the points in the touch point sequence and the points in the predicted point sequence by means of a deferred-acceptance algorithm, to find the actual touch points matched by each touch trajectory, so as to be able to generate a touch trajectory. Compared to the traditional method of matching the closest touch points on the previous and next frames, this method can eliminate the interference of the touch points of different users when a plurality of people use the touch screen device at the same time, to find the most stable touch points, and thus to improve the accuracy of the touch point matching. Therefore, the method is able to obtain an accurate touch trajectory based on the accurately matched touch points. A frame represents the detection result at a moment, for example, the detection result at the moment T is a frame, the detection result at the moment T+1 is another frame, and the two are in the relationship of previous and next frames. The time interval between the moment T and the moment T+1 is the time interval between neighboring frames.

The method for matching touch points provided by embodiments of the present application is explained and described in detail below.

Figure 1:
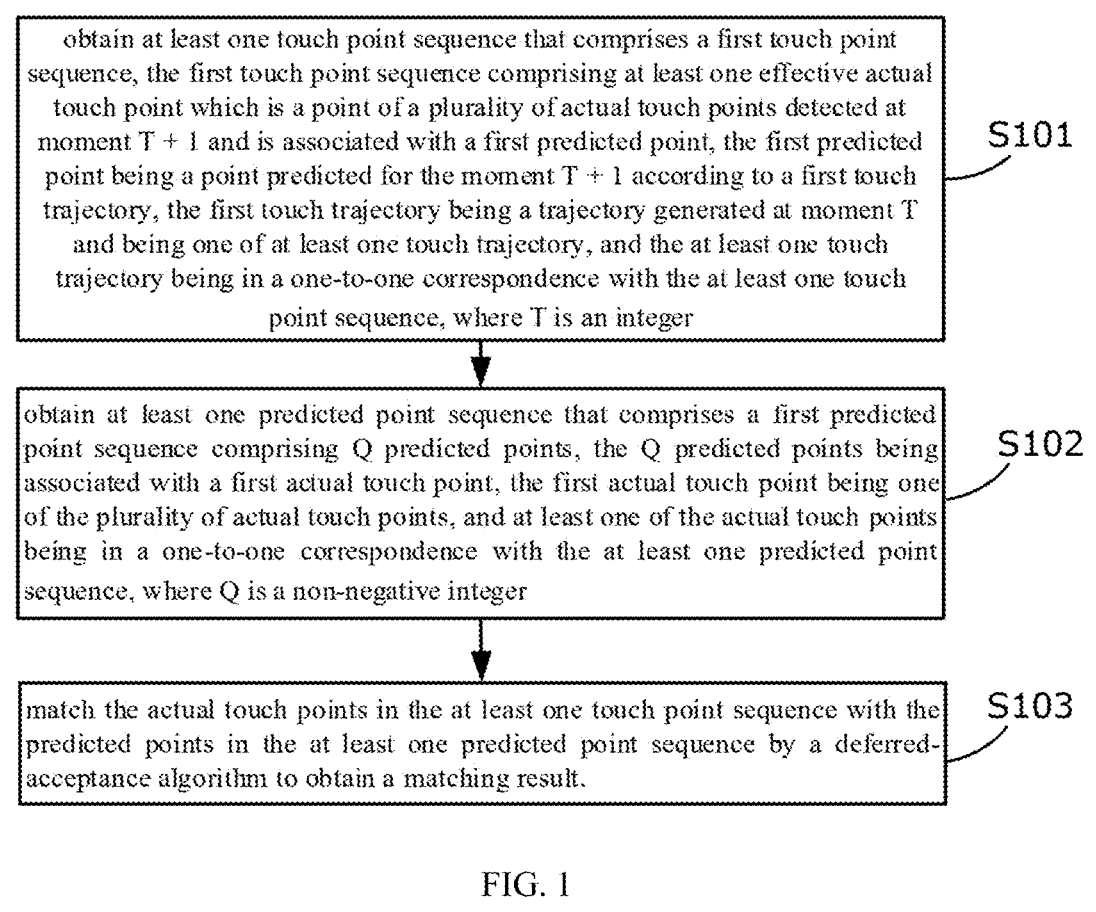

FIG. 1 is a flowchart of a method for matching touch points provided by embodiments of the present application. Referring to FIG. 1, the method includes the following steps: S101, S102, and S103.

In S101, at least one touch point sequence is obtained.

The above at least one touch point sequence includes a first touch point sequence which includes at least one effective actual touch point. The at least one effective actual touch point is a point among the plurality of actual touch points detected at the moment T+1. The at least one effective actual touch point is associated with the first predicted point. The first predicted point is a point predicted for the moment T+1 based on the first touch trajectory. The first touch trajectory is a trajectory generated at the moment T, and the first touch trajectory is one of the at least one touch trajectory. The at least one touch trajectory is in one-to-one correspondence with the at least one touch point sequence, where Tis an integer.

The electronic device may make a prediction based on a touch trajectory generated at the moment T. It should be noted that the trajectory generated at the moment T contains touch points detected at the moment T. Taking the touch trajectory as a first touch trajectory as an example, the first predicted point corresponding to the first touch trajectory at the moment T+1 is obtained. It should be noted that the electronic device may predict each touch trajectory that already exists at the T moment to obtain the predicted point corresponding to each touch trajectory. Thus when there are a plurality of the touch trajectories, a plurality of predicted points can be obtained, namely, the predicted points are in one-to-one correspondence with the touch trajectories.

In some embodiments, the electronic device may further obtain a plurality of actual touch points at the moment T+1 and calculate a degree of association between the first predicted point and each actual touch point. Optionally, the degree of association may be characterized by a Euclidean distance (i.e., a distance), with a large Euclidean distance indicating a low degree of association and a small Euclidean distance indicating a high degree of association. For example, the actual touch points with a Euclidean distance less than or equal to a distance threshold may be sorted in ascending order of Euclidean distance to obtain a sequence St of touch points corresponding to the first predicted point. In some embodiments, all of the actual touch points may be sorted in ascending order of Euclidean distance to obtain a sequence St of touch points corresponding to the first predicted point. The Euclidean distance is used to determine the association degree, and the algorithm is simple and easy to implement. With screening the touch point sequence by using the preset distance threshold, the points with low partial correlation degree is deleted, and the subsequent calculation amount is reduced.

Similarly, the electronic device may obtain a touch point sequence St corresponding to each predicted point. For example, the touch point sequence St1 corresponding to the predicted point 1 for the touch trajectory Trace1 may be {a, g, b, f}; the touch point sequence St2 corresponding to the predicted point 2 for the touch trajectory Trace2 may be {a, b, f, g, c}; the touch point sequence St3 corresponding to the predicted point 3 for the touch trajectory Trace3 may be {b, c, a, f, d, g}; the sequence St4 of the touch points corresponding to the predicted point 4 for the touch trajectory Trace4 may be {c, d, b, f}; the touch point sequence St5 corresponding to the predicted point 5 for the touch trajectory Trace5 may be {d, c, b}; the touch point sequence St6 corresponding to the predicted point 6 for the touch trajectory Trace6 may be {d, c}.

The electronic device may further obtain at least one pre-generated touch point sequence, such as reading at least one pre-stored touch point sequence. The at least one touch point sequence may be one or more, such as two, three, six, or some other number.

In S102, at least one predicted point sequence is obtained.

The at least one predicted point sequence includes a first predicted point sequence, the first predicted point sequence being any one of the at least one predicted point sequence. The first predicted point sequence includes Q predicted points associated with the first actual touch point, the first actual touch point is one of a plurality of actual touch points, and the plurality of actual touch points are in one-to-one correspondence with the at least one predicted point sequence, where Q is a non-negative integer, such as 2, 3, 5, and the like.

In some embodiments, the electronic device first obtains a plurality of actual touch points at the moment T+1. A degree of correlation between any one of the plurality of actual touch points and the other predicted points is then calculated. For example, a Euclidean distance between any one of the plurality of actual touch points and the other predicted points may be calculated. The Euclidean distance is used to characterize the degree of correlation, and the algorithm is simple and easy to implement. To describe any one of the plurality of actual touch points as a first actual touch point, the electronic device may calculate a Euclidean distance between the first actual touch point and any one of the predicted points, sort the predicted points with a Euclidean distance less than or equal to the distance threshold in ascending order of the Euclidean distances, and obtain a predicted point sequence Sp corresponding to the first touch point, In some embodiments, all the predicted points may be sorted in ascending order of the Euclidean distances, obtaining a predicted point sequence corresponding to the first actual touch point.

When a plurality of the actual touch points are provided, a plurality of the sequences of the predicted points can be obtained, i.e., the actual touch points are in one-to-one correspondence with the predicted point sequences.

For example, the predicted point sequence corresponding to the touch point a may be {1, 2, 3}; the predicted point sequence corresponding to the touch point b may be {3, 2, 4, 1, 5}; the predicted point sequence corresponding to the touch point c may be {4, 5, 3, 6, 2}; the predicted point sequence corresponding to the touch point d may be {5, 4, 6, 3}; the sequence for touch point e may be the empty sequence denoted as { }, which represents that Euclidean distances between the actual touch point and all the predicted points is greater than the distance threshold, and the predicted point sequence corresponding to the touch point f may be {2, 3, 1, 4}.

The electronic device may further obtains at least one pre-generated predicted point sequence, for example by reading at least one stored predicted point sequence. The at least one predicted point sequence may be one or more, such as two, three, six or some other number.

The touch point sequence and the predicted point sequence are prioritized sequences, the actual touch points in the touch point sequence are the actual touch points that are selected out to have a high priority when matching, and the actual touch points with a low priority are not in the touch point sequence or are arranged in a backward position. The predicted points in the predicted point sequence are the predicted points that are selected out to have a high priority when matching, and the predicted points with a low priority are not in the predicted point sequence or are arranged in a backward position.

In S103, the actual touch points in the at least one touch point sequence is matched with the predicted points in the at least one predicted point sequence to obtain a matching result by a deferred-acceptance algorithm.

First, the deferred-acceptance algorithm is briefly introduced: in the matching process of the deferred-acceptance algorithm, an object will not be matched directly at the first time after receiving an offer, but will be reserved after receiving an offer from another party, and then form a matching relationship with the best one among the objects of a plurality of offer senders according to the plurality of offers received. The deferred-acceptance algorithm in the present application may be the Gale-Shapley algorithm abbreviated as "GS algorithm"; it may also be other algorithms combined with the GS algorithm, such as using the GS algorithm for matching and then filtering again to obtain matching objects; it is also possible to preprocess the objects that need to be matched in the input GS algorithm before using the GS algorithm to optimize the algorithm process; it can be any other algorithm that improves the GS algorithm, as long as it is an algorithm with deferred-acceptance characteristics.

The GS algorithm is a market mechanism designed to find a stable match. For example, an object Sp on one part of the market sends an offer to an object St on another part, and each object St is compared with all the offers it receives, keeps the one it considers the best, and rejects the others. The rejected object Sp continues to send new offers to other objects St until no objects Sp wishes to send another offer. It is at this point that each object St finally accepts its reserved offer, forming a matching relationship between that object St and the object Sp for which the offer was reserved. A key aspect of the GS algorithm is that a consensual offer is not accepted immediately, but is only temporarily retained without being rejected, i.e., "deferred acceptance". Thus, the party that receives offer can choose the most compatible object among the plurality of offers received to form a matching relationship.

The algorithmic flow of the GS algorithm is illustrated by taking a plurality of touch point sequences and a plurality of predicted point sequences shown in Table 1 as an example, where the sequences St in Table 1 are obtained by the method of step S101 and the sequences Sp are obtained by the method of step S102.

TABLE 1

| Touch trajectory | St sequence | Actual touch points | Sp sequence |
|---|---|---|---|
| Trace1 | St1: {a g b f} | a | Sp1: {1, 2, 3} |
| Trace2 | St2: {a b f g c} | b | Sp2: {3, 2, 4, 1, 5} |
| Trace3 | St3: {b c a f d g} | c | Sp3: {4, 5, 3, 6, 2} |
| Trace4 | St4: {c d b f} | d | Sp4: {5, 4, 6, 3} |
| Trace5 | St5: {d c b} | e | Sp5: { } |
| Trace6 | St6: {d c} | f | Sp6: {2, 3, 1, 4} |
|  |  | g | Sp7: {1, 2, 3} |

Specifically, the first round of the algorithm: each sequence St sends, according to the first actual touch point in the sequence, an offer to the predicted point sequences corresponding to the first actual touch point. The actual touch point a receives offers from sequence St1 and sequence St2, the actual touch point b receives an offer from sequence St3, the actual touch point c receives an offer from sequence St4, the actual touch point d receives offers from sequence St5 and sequence St6, and the actual touch point e, the actual touch point f, and the actual touch point g do not receive offers.

The actual touch point a retains the offer sent by sequence St1 and discards the offer from sequence St2 according to the prioritized order in the corresponding touch point sequence Sp1, so St1 no longer executes the later rounds of the algorithm, and the actual touch point a no longer accepts other offers, and at this time, the matching relationship between the actual touch point a and the predicted point 1 is established.

The actual touch point b retains the offer sent by the sequence St3, so the sequence St3 no longer executes the later rounds of the algorithm, and the actual touch point b no longer accepts other offers, and at this time, the matching relationship between the actual touch point b and the predicted point 3 is established.

The actual touch point c retains the offer sent by sequence St4, so sequence St4 no longer executes the later rounds of the algorithm, and the actual touch point c no longer accepts other offers, and at this time, the matching relationship between the actual touch point c and the predicted point 4 is established.

The actual touch point d retains the offers sent by sequence St5, so sequence St5 no longer executes the later rounds of the algorithm, and the actual touch point d no longer accepts other offers, and at this time, the matching relationship between the actual touch point d and the predicted point 5 is established.

The second round of the algorithm: each sequence St sends, according to the second actual touch point in the sequence, an offer to the predicted point sequence corresponding to the second actual touch point. The offer sent by sequence St2 to the actual touch point b is rejected because the actual touch point b retains the best offer sent by sequence St3 according to the prioritization order in touch point sequence Sp2, and the sequence St2 continues to execute the next round of algorithm. The offer sent by sequence St6 to the actual touch point c is rejected because the actual touch point c retains the best offer sent by the sequence St4 according to the prioritized order in sequence Sp3, all the actual touch points in the sequence St6 have sent offers, and the sequence St6 exits and does not execute the following rounds of the algorithm any more.

The third round of the algorithm: each sequence St sends, according to the third actual touch point in the sequence, an offer to the predicted point sequence corresponding to the third actual touch point, and St2 sends an offer to the actual touch point f. The actual touch point f retains the offer sent by St2 according to the prioritized order in sequence Sp6, and at this time, the matching relationship between the actual touch point f and the predicted point 2 is established.

Up to this point, St6 and actual touch point e and actual touch point g exit, and actual touch point a matches with predicted point 1; the actual touch point b matches with predicted point 3; the actual touch point c matches with predicted point 4; the actual touch point d matches with predicted point 5; and actual touch point f matches with predicted point 2. Matching is complete, and the matching results shown in Table 1 are obtained.

According to the above matching algorithm, if a matching relationship is established between the actual touch points and the predicted points, the matching relationship can be saved to the matching result, and the actual touch points that have not obtained the matching relationship can also be added to the matching result.

The examples in Table 1 above are examples of actual touch points in the matching result where a matching relationship exists and where a matching relationship is not obtained. In some cases, the matching results may only have matching relationships but no actual touch points without matching relationships.

The actual touch point for which a matching relationship is not obtained as described above may be the starting point of a new touch trajectory, or it may be a misidentified point, such as a system-generated misidentified point, or a touch point generated by the touch of a person other than the operator of the above-described touch trajectory.

In the present embodiments, the electronic device matches the touch point sequence and the predicted point sequence by a deferred-acceptance algorithm to obtain the predicted points and the actual touch points that have matching relationships, thereby obtaining a matching result. In the method, due to the deferred-acceptance algorithm used in the process of obtaining the matching relationship, the actual touch points are not directly matched at the first time after receiving the offer, but first retain the offer after receiving the offer, and then combine a plurality of offers received to select again from the plurality of the offer senders, and the best one is retained as the matching object. This process is a two-way selection process, and the matching relationship obtained through the two-way selection is more stable and the matching result is more accurate. Further, the touch trajectory generated using the accurate matching results is also more stable and precise, which can avoid confusing different user touch trajectories when a plurality of persons are writing at the same time, resulting in an inaccurate touch trajectory and thus affecting the user experience.

In the embodiment shown in FIG. 1 above, it is described with a touch point sequence as an offer sender and a predicted point sequences as an offer receiver, and in fact, in the matching process, it is possible to perform that the touch point sequence as an offer receiver and the predicted point sequence as an offer sender, and the embodiments of the present application do not limit this.

Optionally, as one possible implementation of the above S101, one can refer to the process shown in FIG. 2, which is a flowchart of an example of a process for obtaining a first touch point sequence provided in embodiments of the present application. The process includes the following S201, S202, S203, and S204.

In S201, a prediction is made based on the first touch trajectory to obtain the first predicted point.

The electronic device obtains the touch trajectory that has been generated at the moment T. Based on the touch trajectory at the moment T, a prediction is made for the moment T+1 and obtains the predicted point at the moment T+1. The prediction can be done by using Kalman filtering algorithm or by using the displacement of the touch point trajectory at the previous moment (T moment) to calculate the predicted point at the next moment (T+1 moment). For example, point K is a touch point that moves according to the touch speed at the moment T. The coordinates of point K are (x1, y1) according to the position data and speed data of point K, the speed is decomposed into the speed $V_x$ in the X-axis direction and the speed $V_y$ in the Y-axis direction, and Δt is the time interval between adjacent moments, so that the X-axis coordinate x2 of the predicted point at the moment T+1 can be computed as $x2=x1+V_y \Delta t$, and the Y-axis coordinate y2 of the predicted point at the moment T+1 can be computed as $y2=y1+V_y \Delta t$. That is, the predicted point at the moment T+1 is $(x1+V_y \Delta t, y1+V_y \Delta t)$. The velocity data of the above point K can be determined based on the position of the point at the moment T−1 on the touch trajectory where point K is located, and the time interval between the two adjacent moments T−1 and T.

In some embodiments, the predicted points predicted based on the touch trajectory may include: the predicted point 1 is predicted from the touch trajectory Trace1, the predicted point 2 is predicted from the touch trajectory Trace2, the predicted point 3 is predicted from the touch trajectory Trace3, the predicted point 4 is predicted from the touch trajectory Trace4, the predicted point 5 is predicted from the touch trajectory Trace5, and the predicted point 6 is predicted by the touch trajectory Trace6, where the first predicted point is any one of them.

In S202, a plurality of actual touch points are obtained.

The electronic device obtains n actual touch points at the moment T+1. The actual touch points are detected by the electronic device through a touch screen, and the actual touch points may be points touched by a single person or may contain points touched by a plurality of persons. For example, the actual touch point may be denoted by a, b, c, d, e, f, and g.

In S203, a Euclidean distance between any one of the plurality of actual touch points and the first predicted point is determined.

The electronic device calculates the Euclidean distance between the first predicted point and each actual touch point. The formula for calculating the Euclidean distance between the two points may be $D=\sqrt{(x2-x1)^2+(y2-y1)^2}$ or a variation of the formula, where coordinates of one point are (x1, y1), and coordinates of the other point are (x2, y2). For example, the first predicted point is predicted point 1, and the plurality of the actual touch points are a, b, c, d, e, f, and g. The distances between the first predicted point and each of the actual touch points are calculated to obtain the distances D1a, D1b, D1c, D1d, D1e, D1f, and D1g.

In S204, the actual touch points whose Euclidean distance is less than or equal to a distance threshold is arranged in ascending order to obtain the first touch point sequence.

The electronic device determines the relationship between the distance threshold V and the Euclidean distance between each actual touch point and the first predicted point. If the Euclidean distance is greater than the distance threshold V, indicating that the actual touch point and the first predicted point are not highly correlated, the actual touch point is discarded and not added to the first touch point sequence; if the Euclidean distance is less than or equal to the distance threshold V, the actual touch point is retained, and the first touch point sequence is obtained by arranging all of the retained actual touch points in ascending order. Optionally, the above distance threshold V may be a pre-set constant, for example, 5 centimeters or other constants, which is not limited in the embodiments of the present application. For example, $D1a<D1g<D1b<D1f<V$, and D1c, D1d, and D1e are all greater than the distance threshold V. Therefore, the distance sequence is obtained as {D1a, D1g, D1b, D1f}, and a first touch point sequence {a, g, b, f} is obtained based on the actual touch points corresponding to the Euclidean distances in the distance sequence.

If a plurality of the touch trajectories are provided, namely Trace1, Trace2, Trace3, Trace4, Trace5, Trace6, the electronic device can obtain the predicted points corresponding to each touch trajectory according to the above manner. For example, the predicted point corresponding to the touch trajectory Trace1 is predicted point 1; the predicted point corresponding to the touch trajectory Trace2 is predicted point 2; the predicted point corresponding to the touch trajectory Trace3 is predicted point 3; the predicted point corresponding to the touch trajectory Trace4 corresponding to predicted point 4; the predicted point corresponding to the touch trajectory Trace5 is predicted point 5; the predicted point corresponding to the touch trajectory Trace6 is predicted point 6.

If the touch points obtained at the moment T+1 are a, b, c, d, e, f, and g, the distance sequence obtained according to the above method is as follows:

The distance sequence corresponding to the predicted point 1 corresponding to the touch trajectory Trace1 may be: {D1*a*, D1*g*, D1*b*, D1*f*}, and then the touch point sequence {a, g, b, f} is obtained.

The distance sequence corresponding to the predicted point 2 corresponding to the touch trajectory Trace2 may be: {D2*a*, D2*b*, D2*f*, D2*g*, D2*c*}, and then the touch point sequence {a, b, f, g, c} is obtained.

The distance sequence corresponding to the predicted point 3 corresponding to the touch trajectory Trace3 may be: {D3*b*, D3*c*, D3*a*, D3*f*, D3*d*, D3*g*}, and then the touch point sequence {b, c, a, f, d, g} is obtained.

The distance sequence corresponding to the predicted point 4 corresponding to the touch trajectory Trace4 may be: {D4*c*, D4*d*, D4*b*, D4*f*}, and then the touch point sequence {c, d, b, f} is obtained.

The distance sequence corresponding to the predicted point 5 corresponding to the touch trajectory Trace5 may be: {D5*d*, D5*c*, D5*b*}, and then the touch point sequence {d, c, b} is obtained.

The distance sequence corresponding to the predicted point 6 corresponding to the touch trajectory Trace6 may be: {D6*d*, D6*c*}, and then the touch point sequence {d, c} is obtained.

In this embodiment, the electronic device can screen out some actual touch points with weak correlation by calculating the Euclidean distance between each actual touch point and the first predicted point, and deleting the actual touch points whose distance from the predicted point exceeds the distance threshold V, thereby reducing the amount of calculation in the subsequent processing. The retained actual touch points are arranged in ascending order to form a touch point sequence, so that the actual touch point closer to the predicted point is ranker higher. Since the actual touch points retained in the touch point sequence and the predicted point are highly correlated, and the actual touch points ranker higher has the higher correlation with the predicted point and thus is given the higher priority during matching, then the more stable matching relationship is obtained, thereby making the matching results highly accurate.

Figure 3:
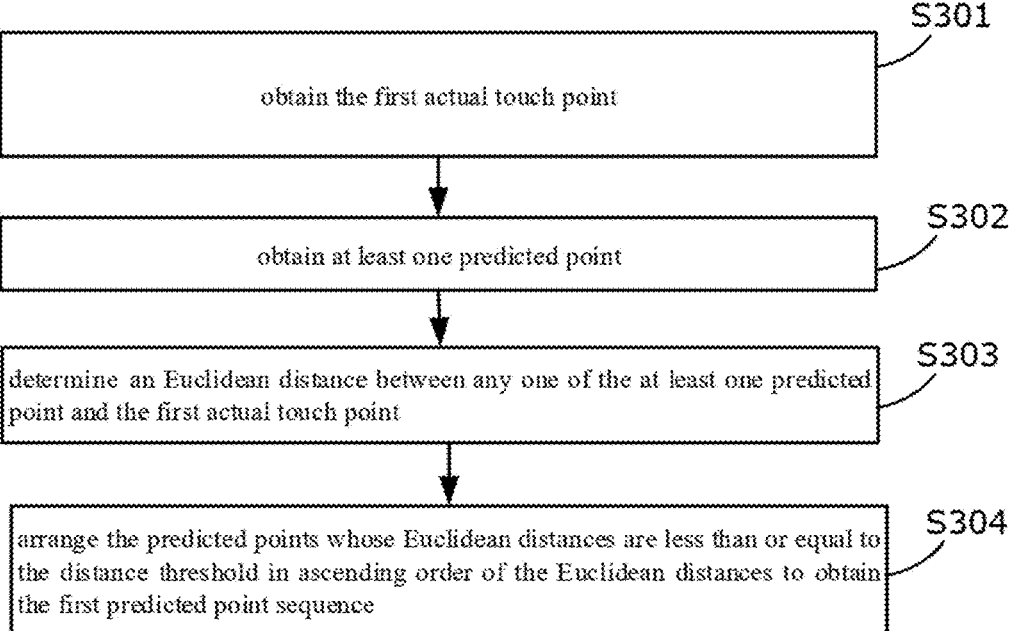
FIG. 3 is a flowchart of an example of a process for obtaining a first predicted point sequence provided in embodiments of the present application.

Optionally, a possible implementation of the above S102 may also refer to the method shown in FIG. 3.

FIG. 3 is a flowchart of a process for obtaining a first predicted point sequence provided in embodiments of the present application. Referring to FIG. 3, the process includes the following steps S301, S302, S303, and S304.

In S301, the first actual touch point is obtained.

The electronic device obtains n actual touch points at the moment T+1, the actual touch points are detected by the electronic device, which may be points touched by a single person or may contain points touched by a plurality of persons, the actual touch points may be denoted by a, b, c, d, e, f, or g, and the first actual touch point may be any one of the n actual touch points. In S302, at least one predicted point is obtained.

The electronic device obtains the touch trajectory at the moment T, and obtains the predicted point at the moment T+1 according to the touch trajectory at the moment T. For the process of obtaining the predicted point, reference may be made to the description in S201 above, which will not be repeated herein.

In S303, a Euclidean distance between any one of the at least one predicted point and the first actual touch point is determined.

The electronic device calculates the Euclidean distances between the first actual touch point and the predicted point. The process can also be performed with reference to the process of calculating the Euclidean distance between two points in the aforementioned embodiment, which will not be repeated here. For example, an actual touch point is point a, and the test points are points 1, 2, 3, 4, 5, and 6. The Euclidean distances from the actual touch point a to the test points 1, 2, 3, 4, 5, and 6 are calculated as Da1, Da2, Da3, Da4, Da5, and Da6 respectively.

In S304, the predicted points whose Euclidean distance less than or equal to the distance threshold is arranged in ascending order of Euclidean distance to obtain a first predicted point sequence.

The electronic device determines the relationship between the distance threshold V and the Euclidean distance between each predicted point and the first actual touch point. If the Euclidean distance is greater than the distance threshold V, indicating that the predicted point and the first actual touch point are not highly correlated, the predicted point is discarded and not added to the first predicted point sequence; if the Euclidean distance is less than or equal to the distance threshold V, the predicted point is retained, and the retained predicted points are arranged in ascending order to obtain the first predicted point sequence. Optionally, the above distance threshold V may be a predetermined constant, for example, 1 mm or other constant, which is not limited in the embodiments of the present application. For example, the distances satisfy that Da1<Da2<Da3<V, and Da4, Da5, and Da6 are all greater than the distance threshold V. Therefore, the distance sequence {Da1, Da2, Da3} is obtained, and the first predicted point sequence {1, 2, 3} is obtained based on the predicted points corresponding to the Euclidean distances in the distance sequence.

If the touch points obtained at the moment T+1 are a, b, c, d, e, f, and g, a plurality of touch trajectories are provided, namely Trace1, Trace2, Trace3, Trace4, Trace5, and Trace6, and the electronic device can obtain the predicted point corresponding to each touch trajectory according to the above manner. The predicted point corresponding to the touch trajectory Trace1 is predicted point 1; the predicted point corresponding to the touch trajectory Trace2 is predicted point 2; the predicted point corresponding to the touch trajectory Trace3 is predicted point 3; the predicted point corresponding to the touch trajectory Trace4 is predicted point 4; the predicted point corresponding to the touch trajectory Trace5 is predicted point 5; and the predicted point corresponding to the touch trajectory Trace6 is predicted point 6. The distance sequence is obtained according to the above manner as follows:

The distance sequence corresponding to the touch point a may be {D1*a*, D2*a*, D3*a*}, and then the predicted point sequence {1, 2, 3} is obtained.

The distance sequence corresponding to the touch point b may be {D3*b*, D2*b*, D4*b*, D1*b*, D5*b*}, and then the predicted point sequence {3, 2, 4, 1, 5} is obtained.

The distance sequence corresponding to the touch point c may be {D4*c*, D5*c*, D3*c*, D6*c*, D2*c*}, and then the predicted point sequence {4, 5, 3, 6, 2} is obtained.

The distance sequence corresponding to the touch point d may be {D5d, D4d, D6d, D3d}, and then the predicted point sequence {5, 4, 6, 3} is obtained.

The distance sequence corresponding to the touch point e may be { }, and then the predicted point sequence { } is obtained.

The distance sequence corresponding to the touch point f may be {D2f, D3f, D1f, D4f}, and then the predicted point sequence {2, 3, 1, 4} is obtained.

The distance sequence corresponding to the touch point g may be {D1g, D2g, D3g}, and then the predicted point sequences {1, 2, 3} is obtained.

In this embodiment, the electronic device can screen out some actual touch points with weak correlation by calculating the Euclidean distance between each actual touch point and the first predicted point, and deleting the actual touch points whose distance from the predicted point exceeds the distance threshold V, thereby reducing the amount of calculation in the subsequent processing. The retained actual touch points are arranged in ascending order to form a touch point sequence, so that the actual touch point closer to the predicted point is ranked higher. Since the actual touch points retained in the touch point sequence and the predicted point are highly correlated, and the actual touch points ranked higher has the higher correlation with the predicted point and thus is given the higher priority during the matching, then the more stable matching relationship is obtained, thereby making the matching results highly accurate.

Figures 4, 5:
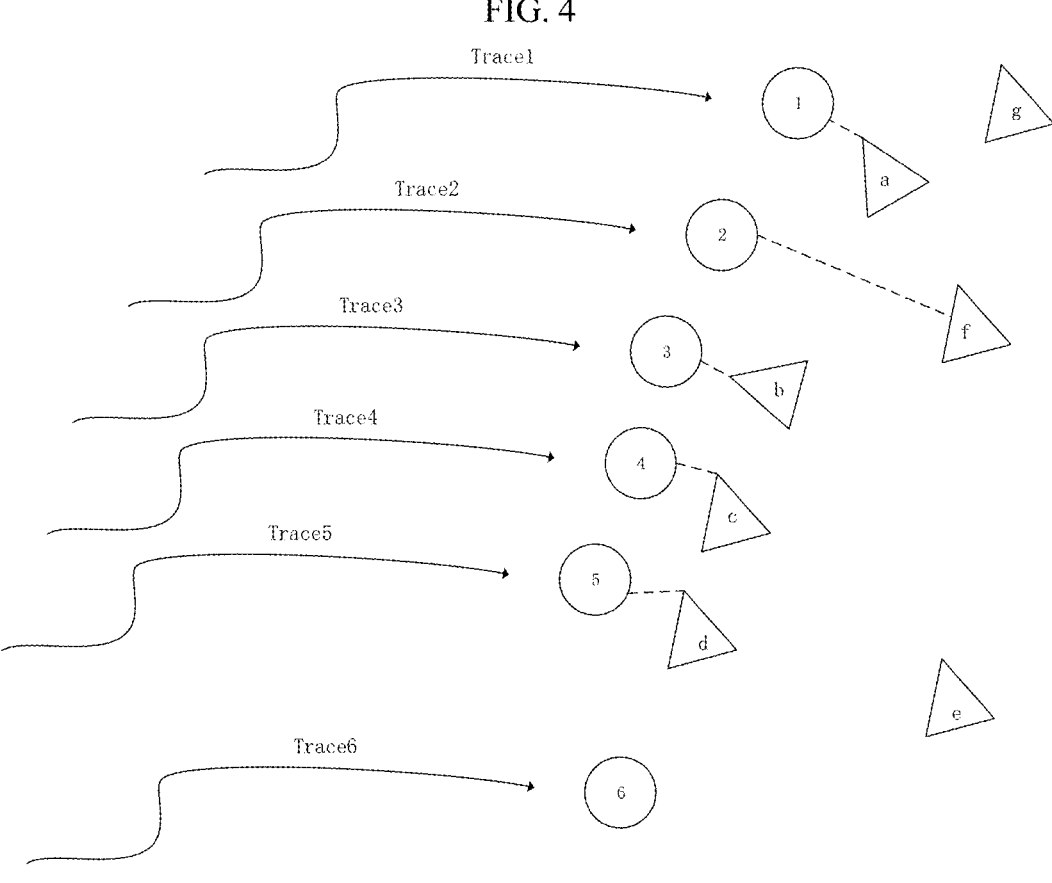
FIG. 4 is a schematic diagram of a matrix of Euclidean distances for an example of a plurality of touch points and a plurality of predicted points provided in an embodiment of the present application.
FIG. 5 is a schematic diagram of an example of a touch point matching result provided in an embodiment of the present application.

In some embodiments, as shown in FIG. 4, where M predicted points and O actual touch points are provided, the Euclidean distance between each predicted point and each actual touch point is determined to form an M×O matrix as shown in FIG. 4, where M is 6 and O is 7 as an example. The electronic device may obtain the above-described touch point sequence and the predicted point sequence from the matrix. If the selection conditions need to be transformed, for example, the distance threshold V being changed, the above predicted point sequence and the touch point sequence can be obtained again from this matrix without recalculating the Euclidean distances between the various points, which facilitates repeated calls of the data and thus reduces the repetitive calculations.

In some embodiments, the matching result obtained from the matching may be a matching relationship between the predicted point and the actual touch point at the moment T+1 mentioned in the embodiment shown in FIG. 1. The second touch trajectory is the same as or different from the first touch trajectory, without limitation. Optionally, the matching result may further include a matching relationship between the touch trajectory at the moment T and the actual touch point at the moment T+1. Since each predicted point can be obtained by making a prediction based on a touch trajectory, the electronic device can establish a matching relationship between the touch trajectory that generates this predicted point and the actual touch point that the predicted point matches. Based on such a matching relationship, the electronic device can update the existing touch trajectory to generate an accurate matching relationship in real time.

The above matching results may further include actual touch points that did not obtain a matching relationship, which are denoted here as unmatched touch points. The unmatched touch point is either an error point or the starting point of a new touch trajectory. Whether the unmatched touch point is the starting point of the new touch trajectory can be determined by obtaining the actual touch points detected in the subsequent frames. For example, the electronic device may use the touch point matching method described in the foregoing, and if the unmatched touch point can establish a matching relationship with the actual touch point detected in the subsequent frame, the unmatched touch point and the actual touch point with which the matching relationship is established can form a new touch trajectory. If the unmatched touch point cannot establish a matching relationship with the actual touch point detected in the subsequent frame, the unmatched touch point can be considered as an error point and can be cleared, thereby eliminating the interference of the error point and improving the accuracy of the touch trajectory.

In some embodiments, the matching results shown in Table 1 above can be seen in FIG. 5, where the electronic device obtains the touch trajectories Trace1, Trace2, Trace3, Trace4, Trace5, and Trace6 at the moment T, and obtains the predicted points 1, 2, 3, 4, 5, 6 corresponding to the respective trajectory at the moment T+1 according to the touch trajectories at the moment T. The electronic device obtains the actual touch points a, b, c, d, e, f, and g at the moment T+1. The method for matching touch point described above is used for matching, and the following matching relationship is obtained: the predicted point 1 matches the actual touch point a, and thus the touch trajectory Trace1 matches the actual touch point a; the predicted point 2 matches the actual touch point f, and thus the touch trajectory Trace2 matches the actual touch point f; the predicted point 3 matches the actual touch point b, and thus the touch trajectory Trace3 matches the actual touch point b; the predicted point 4 matches the actual touch point c, and thus touch trajectory Trace4 matches the actual touch point c; the predicted point 5 matches the actual touch point d, and thus touch trajectory Trace5 matches actual touch point d, where none of the predicted point 6, and actual touch points e, g is matched.

For example, if the predicted point 1 and the actual touch point a have a matching relationship, indicating that the actual touch point a and the Trace1 corresponding to the predicted point 1 have a matching relationship, and the actual touch point a is the point touched by the Trace1 at the moment T+1, i.e., the operator of the actual touch point a and the Trace1 is the same person; if the actual touch points e, g are unmatched touch points, the actual touch points e, g are either the error points or the starting point of the new touch.

The method for matching touch point is described in the foregoing, and the process of obtaining a touch trajectory using the above method for matching touch point is described in detail below.

Figure 6:
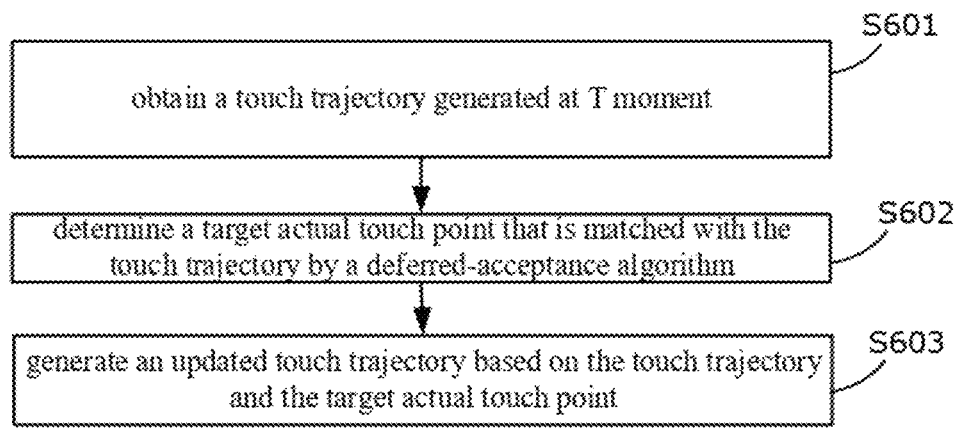
FIG. 6 is a flowchart of an example of a method for obtaining a touch trajectory provided in embodiments of the present application.

FIG. 6 is a flowchart of an example of a method for obtaining a touch trajectory provided in embodiments of the present application. As shown in FIG. 6, the method includes the following S601, S602, and S603.

In S601, the touch trajectory generated at T moment is obtained.

The electronic device obtains the touch trajectories at the T moment, and the touch trajectories at the moment T may be one or more. In some embodiments, the touch trajectories obtained at the moment T are Trace1, Trace2, Trace3, Trace4, Trace5, and Trace6.

In S602, the target actual touch point that is matched with the touch trajectory by a deferred-acceptance algorithm is determined.

The electronic device may use a method for matching touch points as described in the preceding embodiments to match the predicted point at moment T+1 and the actual touch point at moment T+1 to obtain a target actual touch point having a matching relationship with the touch trajectory. It is to be noted that a touch trajectory may obtain one target actual touch point that is matched with it.

In S603, an updated touch trajectory based on the touch trajectory and the target actual touch points is generated.

Figure 7:
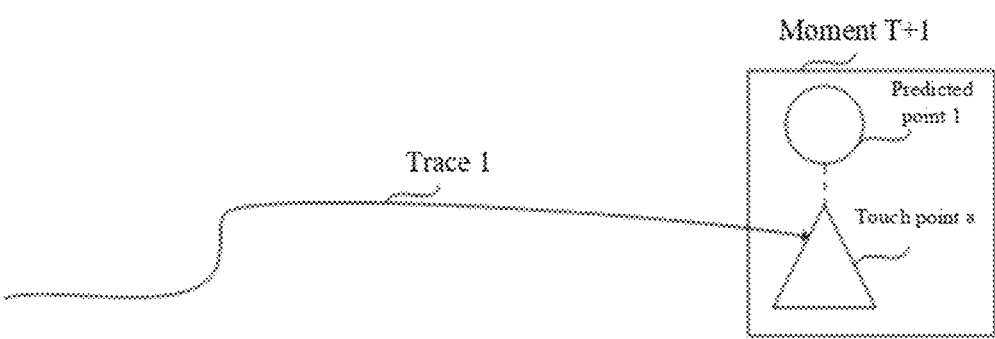
FIG. 7 is a flowchart of an example of a method of generating an updated touch trajectory provided in embodiments of the present application.

Based on the matching result, the electronic device generates an updated touch trajectory if the match is successful; for example, the trajectory at the moment T is Trace1, the predicted point at the moment T+1 is 1, and the touch point at the moment T+1 is a. If the touch point a is matched with the predicted point 1, the electronic device generates an updated touch trajectory that contains the touch point a, as shown in FIG. 7.

Figure 8:
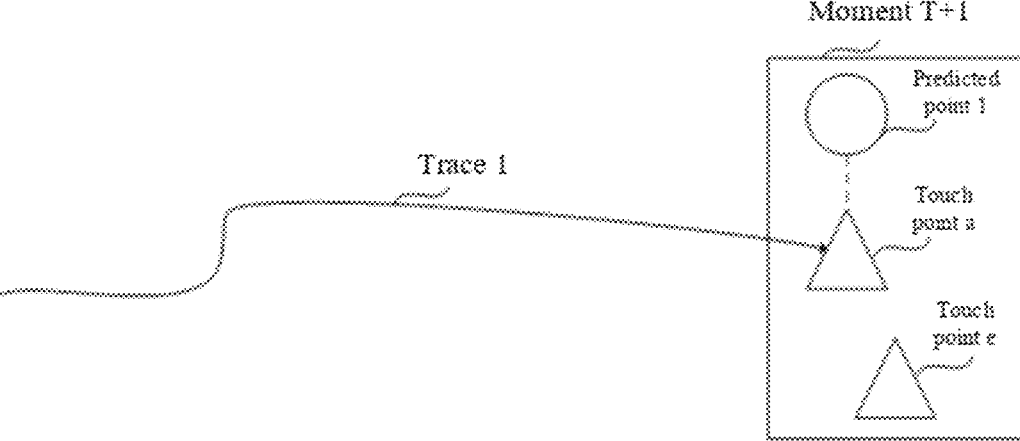
FIG. 8 is a schematic view of an example of an unsuccessfully matched touch point provided in an embodiment of the present application.

Optionally, the unmatched actual touch point indicates a new touch trajectory or a misidentified point. The unmatched actual touch point may be subsequently verified in a plurality of frames to confirm whether it is the starting point of the new touch trajectory. For example, if the predicted point 1 of the touch trajectory Trace1 is matched with the actual touch point a, the touch trajectory Trace1 and the touch point a are associated to generate an updated touch trajectory. If the actual touch point e is an unmatched touch point, it means that the actual touch point e is a new trajectory or an error point, as shown in FIG. 8.

In this embodiment, the electronic device calculates the actual touch point sequence and the predicted point sequence by obtaining the touch trajectory at the moment T. And then a deferred-acceptance algorithm is further used to associate and match the actual touch point priority sequence with the predicted point priority sequence. Due to the deferred-acceptance algorithm used in the process of obtaining the matching relationship, the actual touch points are not directly matched at the first time after receiving the offer, but first retain the offer after receiving the offer, and then combine a plurality of offers received to select again from the plurality of the offer senders, and the best one is retained as the matching object. This process is a two-way selection process, and the matching relationship obtained through the two-way selection is more stable and the matching result is more accurate. As a result, the touch trajectory generated using the accurate matching results is also more stable and precise, which can avoid confusing different user touch trajectories when a plurality of persons are writing at the same time, resulting in an inaccurate touch trajectory and thus affecting the user experience.

FIG. 9 is a flowchart of a method for verifying unmatched touch points provided in embodiments of the present application. As shown in FIG. 9, the method includes the following S901, S902, S903, and S904.

In S901, the unmatched touch point at the moment T+1 is obtained.

The electronic device obtains the unmatched touch points at the moment T+1. For example, seven actual touch points a, b, c, d, e, f, and g at moment T+1 are provided, which are matched by the above-mentioned method for matching touch point, where the two touch points e and g are not successfully matched, and the two touch points e and g are unmatched touch points.

In S902, at least one actual touch point collected at each of the moments T+2 to T+N is obtained.

After the electronic device completes the matching, the electronic device obtains touch points at moments T+2 to T+N. For example, taking N as 3 for example, the electronic device can obtain the touch points h and i at the moment T+2, and obtain touch point j at the moment T+3, and a plurality of the touch points may be obtained at each moment. In some embodiments, N can also be a positive integer greater than 3, such as 4, 5, 6, or a larger value.

In S903, a newly added target actual touch point that is matched with the unmatched touch point of at least one actual touch point collected at each of moments T+2 to T+N by a deferred-acceptance algorithm is determined.

The electronic device uses a deferred-acceptance algorithm to match the unmatched touch points at the moment T+1 with the actual touch points obtained at the moment T+2. For example, the unmatched touch points at the moment T+1 may be actual touch points e and g, which may be considered as the starting point of a trajectory, and then a prediction is performed to obtain the predicted points at the moment T+2. The electronic device further collects the actual touch points h and i at the moment T+2. Thereafter the electronic device adopts the method for matching touch points in the above embodiment, that is, the electronic device adopts a deferred-acceptance algorithm to determine whether the actual touch points e, g has a matching relationship with the actual touch points h, i at the moment T+2. If the unmatched touch point e and the actual touch point h are matched successfully, the newly added target actual touch point h is obtained. Similarly, the electronic device may further obtain the newly added target actual touch points matching the trajectories of the unmatched touch point e and the actual touch point h in the subsequent moment after the moment T+2.

In S904, a newly added touch trajectory based on the unmatched touch points and the newly added target actual touch points is generated.

The electronic device may generate a new touch trajectory, called the newly added touch trajectory, based on the unmatched touch points and the newly added target actual touch points having a matching relationship with the unmatched touch points. For example, as shown in FIG. 10, taking N being 3 as an example, the electronic device obtains the actual touch points h and i at the moment T+2, and adopts the method of the embodiments described above to verify whether the unmatched touch points e and g at the moment T+1 can successfully match with the actual touch points h and i obtained at the moment T+2 to obtain a matching relationship. If the unmatched touch point e is successfully matched with the actual touch point h, the unmatched touch point e and the actual touch point h are determined to be the same touch trajectory, indicating that the unmatched touch point e is the starting point of a new touch trajectory. If the actual touch point j detected at the moment T+3 is matched successfully with the actual touch point h, the unmatched touch point e, the actual touch point h, and the actual touch point j are the same touch trajectory. If the unmatched touch point g does not have a match at the T+2 moment, it indicates that the unmatched touch point g is an error point, and the electronic device clears the unmatched touch point g.

In this embodiment, the electronic device obtains the actual touch points at the moments from T+2 to T+N to verify the unmatched touch points at the moment T+1 by means of the method for matching touch points in the above-described embodiment, so as to provide higher accuracy in the judgment result of whether the unmatched touch points at the moment T+1 are the starting point of a new touch trajectory or an error point. Therefore, the method can accurately select the error point out and clear the error point, avoiding the interference generated by the error point that leads to inaccurate touch trajectory, thus improving the accuracy of the touch trajectory.

Figure 11:
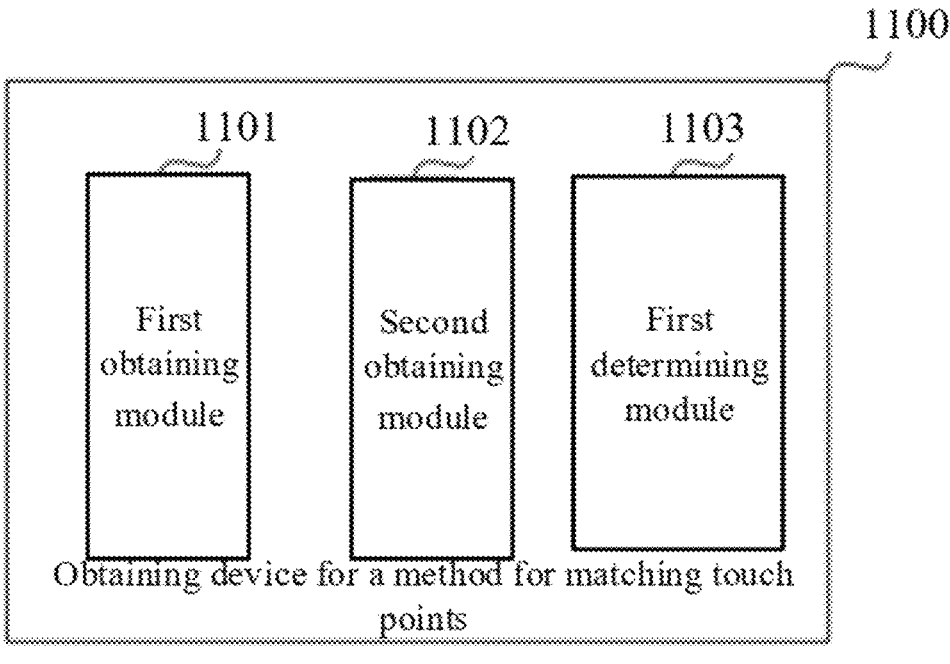
FIG. 11 is a schematic structural view of an obtaining device for the method for matching touch points provided by embodiments of the present application.

FIG. 11 illustrates a schematic structural view of an obtaining device 1100 for a method for matching touch points provided in the present application. The device 1100 includes a first obtaining module 1101. The first obtaining module 1101 is configured to obtain at least one touch point sequence that includes a first touch point sequence, the first touch point sequence including at least one effective actual touch point which is the point of a plurality of actual touch points detected at the moment T+1 and is associated with a first predicted point. The first predicted point is a point predicted at the moment T+1 according to a first touch trajectory, the first touch trajectory being a trajectory generated at the moment T and being one of the at least one touch trajectory. The at least one touch trajectory is in one-to-one correspondence with the at least one touch point sequence, where T is an integer.

The device 1100 further includes a second obtaining module 1102. The second obtaining module 1102 is configured to obtain at least one predicted point sequence that includes a first predicted point sequence including Q predicted points. The Q predicted points are associated with a first actual touch point that is one of a plurality of actual touch points, and the at least one actual touch point is in one-to-one correspondence with the at least one predicted point sequence, where Q is a non-negative integer.

The device 1100 further includes a first determining module 1103. The first determining module 1103 is configured to match the actual touch points in the at least one touch point sequence with the predicted points in the at least one predicted point sequence by a deferred-acceptance algorithm to obtain a matching result.

In some embodiments, that the at least one effective actual touch point is associated with the first predicted point includes that a Euclidean distance between any one of the at least one effective actual touch point and the first predicted point is less than or equal to a predetermined distance threshold. That the Q predicted points are associated with the first actual touch point includes that a Euclidean distance between any one of the Q predicted points and the first actual touch point is less than or equal to the distance threshold.

In some embodiments, the matching result includes at least one set of matching relationship which includes a first matching relationship, the first matching relationship being a relationship in which a first effective actual touch point is matched with a second touch trajectory each other. The first effective actual touch point is one of the at least one effective actual touch point, and the second touch trajectory is one of the at least one touch trajectory.

In some embodiments, the matching result further includes: an unmatched touch point, which is a point of the at least one actual touch point, and is not matched with any of the at least one touch trajectory.

In some embodiments, the first obtaining module 1101 is specifically configured to: make a prediction based on the first touch trajectory to obtain a first predicted point, obtain a plurality of actual touch points; determine a Euclidean distance between any one of the plurality of actual touch points and the first predicted point; and arrange the actual touch points whose Euclidean distances are less than or equal to the distance threshold in an ascending order of the Euclidean distances to obtain the first touch point sequence.

In some embodiments, the second obtaining module 1102 is specifically configured to: obtain the first actual touch point, to determine a Euclidean distance between any one of the at least one predicted point and the first actual touch point, where the at least one predicted point is in one-to-one correspondence with the at least one prediction trajectory, and to arrange the predicted points whose Euclidean distances that are less than or equal to the distance threshold, in ascending order of Euclidean distances, to obtain the first predicted point sequence.

In some embodiments, the deferred-acceptance algorithm is the Gail Shapley GS algorithm.

The specific manner in which the device 1100 performs the method for matching touch points and the beneficial effects produced can be found in the relevant descriptions in the method embodiments and will not be repeated herein.

Figure 12:
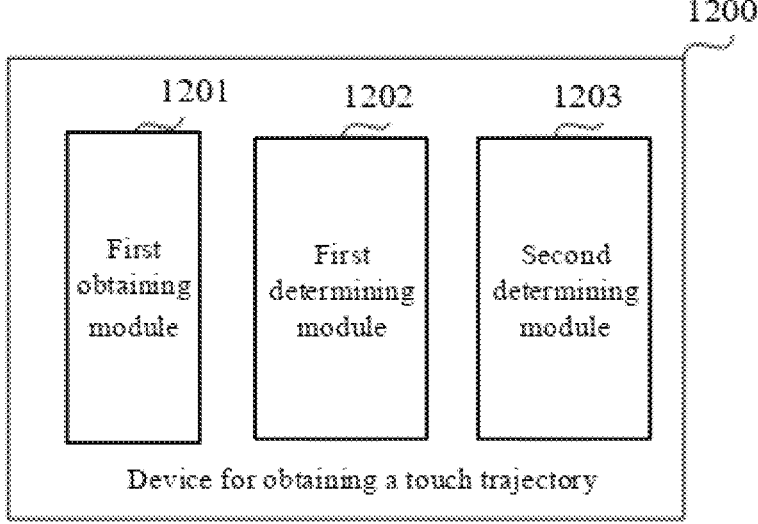
FIG. 12 is a schematic structural view of a device for obtaining a touch trajectory provided by an embodiment of the present application.

FIG. 12 illustrates a schematic structural view of a device 1200 for obtaining a touch trajectory provided in the present application. The device 1200 includes: a first obtaining module 1201, a first determination module 1202, and a second determining module 1203. The first determination module 1202 is configured to obtain the touch trajectory generated at the T moment.

The first determination module 1202 is configured to determine a target actual touch point that is matched with the touch trajectory, the target actual touch point being one of the actual touch points detected at the moment T+1.

The second determining module 1203 is configured to generate an updated touch trajectory based on the touch trajectory and the target actual touch point.

In some embodiments, when the matching result includes unmatched touch point, the device 700 further includes a second obtaining module, a third determination module, and a first generation module.

The second obtaining module is configured to obtain at least one actual touch point collected at each of the moments T+2 to T+N, where N is a positive integer greater than 2, the unmatched touch point is a point of the actual touch points collected at the moment T+1, and is not matched with the touch trajectory.

The third determination module is configured to determine an newly added target actual touch point that is matched with the unmatched touch point among at least one actual touch point collected at each of the moments T+2 to T+N by the method for matching touch points in the above embodiment.

The first generation module is configured to generate a newly added touch trajectory based on the unmatched touch point and the newly added target actual touch point.

The specific manner in which the device 1200 performs the data processing method and the beneficial effects produced can be found in the relevant descriptions in the method embodiments and will not be repeated here.

Figure 13:
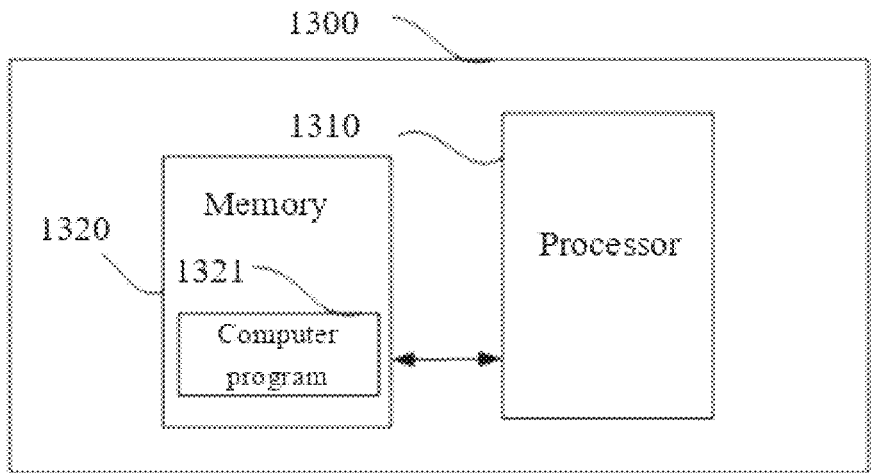
FIG. 13 is a structural schematic view of a computer device provided by an embodiment of the present application.

FIG. 13 is a structural schematic view of a computer device provided by an embodiment of the present application. As shown in FIG. 13, the computer device 1300 includes: a processor 1310, a memory 1320, and a computer program 1321 stored in the memory 1320 and runnable on the processor 1310, and the processor 1310 executes the computer program 1321 to realize the steps in the method for matching touch points or the method for obtaining a touch trajectory in the embodiment described above.

The computer device 1300 may be a general purpose computer device or a specialized computer device. In specific implementations, the computer device 1300 may be a desktop computer, a portable computer, a network server, a PDA, a cell phone, a tablet computer, a wireless terminal device, a communication device, or an embedded device, and embodiments of the present application do not limit the type of computer device 1300. Those skilled in the art can understand that FIG. 13 is merely an example of the computer device 1300 and does not constitute a limitation of the computer device 1300, which may include more or fewer components than illustrated, or a combination of certain components, or different components; for example, it may also include an input-output device, a network access device, and the like. The above-described computer device may be an electronic device as described in the foregoing, and may include a touch screen for receiving a touch operation from a user.

The processor 1310 may be a CPU (Central Processing Unit), the processor 1310 may further be another general purpose processor, a DSP (Digital Signal Processor), an ASIC (Application Specific Integrated Circuit), FPGA (Field-Programmable Gate Array), or other programmable logic device, discrete gate or transistor logic device, discrete hardware components, or the like. A general-purpose processor may be a microprocessor or any conventional processor.

The memory 1320 may be an internal storage unit of the computer device 1300 in some embodiments, such as a hard disk or memory of the computer device 1300. The memory 1320 may further be an external storage device of the computer device 1300 in some other embodiments, such as a plug-in hard disk, a SMC (Smart Media Card), a SD (Secure Digital) card, a Flash Card, or the like equipped on the computer device 1300. Further, the memory 1320 may further include both internal storage units of the computer device 1300 and external storage devices. The memory 1320 is configured to store operating systems, applications, boot loaders, data, and other programs. The memory 1320 may further be configured to temporarily store data that has been or will be output.

The above-described computer device includes at least one processor, a memory, and a computer program stored in the memory and runnable on the at least one processor, the processor executing the computer program to realize the steps in any of the above-described various method embodiments.

Embodiments of the present application further provide a computer-readable storage medium storing a computer program which can realize the steps in each of the above method embodiments when executed by a processor.

Embodiments of the present application provide a computer program product, which enables the computer to perform the steps in each of the method embodiments described above when runs on a computer.

The integrated unit may be stored in a computer-readable storage medium when implemented as a software functional unit, or sold or used as a stand-alone product. Based on this understanding, the present application realizes all or part of the processes in the above-described method embodiments, which may be accomplished by instructing the relevant hardware through a computer program, which may be stored in a computer-readable storage medium, and which, when executed by a processor, realizes the steps of each of the above-described method embodiments. The computer program includes computer program code, the computer program code may be in the form of source code, in the form of object code, in the form of an executable file or in some intermediate form, or the like. The computer-readable medium may at least include: any entity or device capable of carrying the computer program code to a photo device/terminal apparatus, a recording medium, a computer memory, a ROM (Read-Only Memory), a RAM (Random Access Memory), a CD-ROM (Compact Disc Read-Only Memory), magnetic tapes, floppy disks and optical data storage devices. The computer-readable storage media referred to in the present application may be non-volatile storage media, in other words, may be non-transient storage media.

It should be understood that all or some of the steps for realizing the above embodiments may be realized by software, hardware, firmware, or any combination thereof. When implemented using software, it may be implemented in whole or in part in the form of a computer program product. The computer program product includes one or more computer instructions. The computer instructions may be stored in a computer-readable storage medium as described above.

In the above embodiments, the description of each embodiment has its own focus, and portions of an embodiment that are not detailed or documented in a particular embodiment can be found in the relevant descriptions of other embodiments.

One of ordinary skill in the art may realize that the units and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of the technical solution. A person skilled in the art may use different methods to implement the described functions for each particular application, but such implementations should not be considered to be beyond the scope of the present application.

In the embodiments provided in the present application, it should be understood that the device/computer apparatus and method disclosed, may be realized in other ways. For example, the device/computer equipment embodiments described above are merely schematic, for example, the division of modules or units, which is merely a logical functional division, may be divided in other ways when actually implemented, e.g., a plurality of units or components may be combined or may be integrated into another system, or some features may be ignored, or not implemented. At another point, the mutual coupling or direct coupling or communication connection shown or discussed may be an indirect coupling or communication connection through some interface, device or unit, which may be electrical, mechanical or otherwise.

The units illustrated as separated components may or may not be physically separated, and the components displayed as units may or may not be physical units, i.e., they may be located in one place or may be distributed to a plurality of network units. Some or all of these units may be selected to fulfill the purpose of this embodiment scheme according to actual needs.

The embodiments described above are only used to illustrate the technical solutions of the present application, rather than to limit them. Although the present application has been described in detail with reference to the aforementioned embodiments, a person skilled in the art should understand that the technical solutions described in the aforementioned embodiments may still be modified, or some of the technical features may be replaced by equivalents. Such modifications or replacements do not deviate the essence of the corresponding technical solutions from the spirit and scope of the technical solutions of the embodiments of the present application, and should all be included in the protection scope of the present application.

What is claimed is:

1. A method for matching touch points, applied to an electronic apparatus which comprises a touch screen and a processor coupled to the touch screen, and comprising:
   obtaining, by the processor, at least one touch point sequence that comprises a first touch point sequence through the touch screen, the first touch point sequence comprising at least one effective actual touch point which is a point of a plurality of actual touch points detected by the touch screen at moment T+1 and is associated with a first predicted point, the first predicted point being a point predicted by the processor for the moment T+1 according to a first touch trajectory, the first touch trajectory being a trajectory generated by the processor at moment T and being one of at least one touch trajectory, and the at least one touch trajectory being in a one-to-one correspondence with the at least one touch point sequence, where T is an integer;

obtaining, by the processor, at least one predicted point sequence that comprises a first predicted point sequence comprising Q predicted points, the Q predicted points being associated with a first actual touch point, the first actual touch point being one of the plurality of actual touch points, and at least one of the actual touch points being in a one-to-one correspondence with the at least one predicted point sequence, where Q is a non-negative integer; and matching, by the processor, the actual touch points in the at least one touch point sequence with the predicted points in the at least one predicted point sequence by a deferred-acceptance algorithm to obtain a matching result.

2. The method for matching touch points according to claim 1, wherein the at least one effective actual touch point being associated with a first predicted point comprises: an Euclidean distance between any one of the at least one effective actual touch point and the first predicted point being less than or equal to a preset distance threshold; and the Q predicted points being associated with a first actual touch point comprises: an Euclidean distance between any one of the Q prediction points and the first actual touch point being less than or equal to the distance threshold.

3. The method for matching touch points according to claim 2, wherein the obtaining a first touch point sequence comprises:

making, by the processor, a prediction based on the first touch trajectory to obtain the first predicted point;

obtaining the actual touch points through the touch screen;

determining, by the processor, an Euclidean distance between any one of the actual touch points and the first predicted point; and arranging, by the processor, the actual touch points whose Euclidean distances are less than or equal to a distance threshold in ascending order of the Euclidean distances to obtain the first touch point sequence, and wherein the obtaining a first predicted point sequence comprises:

obtaining the first actual touch point through the touch screen;

determining, by the processor, an Euclidean distance between any one of the at least one predicted point and the first actual touch point, the at least one predicted point being in a one-to-one correspondence with the at least one predicted trajectory; and arranging, by the processor, the predicted points whose Euclidean distances are less than or equal to the distance threshold in ascending order of the Euclidean distances to obtain the first predicted point sequence.

4. The method for matching touch points according to claim 1, wherein the matching result comprises at least one set of matching relationship which comprises a first matching relationship, the first matching relationship being a relationship in which a first effective actual touch point is matched with a second touch trajectory each other, the first effective actual touch point being one of the at least one effective actual touch point, and the second touch trajectory being one of the at least one touch trajectory.

5. The method for matching touch points according to claim 4, wherein the matching result further comprises an unmatched touch point, which is a point of the at least one actual touch point and is not matched with any of the at least one touch trajectory.

6. The method for matching touch points according to claim 1, wherein the deferred-acceptance algorithm is the Gail Shapley GS algorithm.

7. A computer device, comprising:

a touch screen configured to detect a touch operation of a user;

a non-transitory memory configured to store a computer program;

a processor coupled to the touch screen and the memory, and configured to execute the computer program, wherein the computer program, when executed by the processor, is to implement the method according to claim 1.

8. A non-transitory computer-readable storage medium, wherein the computer-readable storage medium stores a non-transitory computer program, which implements the method according to claim 1 when executed by a processor.

9. A non-transitory computer program product, comprising instructions that, when executed by a processor of an electronic device, enable the electronic device to perform the method according to claim 1.

10. A method for obtaining a touch trajectory, applied to an electronic apparatus which comprises a touch screen and a processor coupled to the touch screen, and comprising:

obtaining, by the processor, a touch trajectory generated at T moment through the touch screen;

determining, by the processor, a target actual touch point that is matched with the touch trajectory by using a method for matching touch points, wherein the target actual touch point is a point of the actual touch points detected at moment T+1; and generating, by the processor, an updated touch trajectory based on the touch trajectory and the target actual touch point, wherein the method for matching touch points comprises:

obtaining, by the processor, at least one touch point sequence that comprises a first touch point sequence through the touch screen, the first touch point sequence comprising at least one effective actual touch point which is a point of a plurality of actual touch points detected by the touch screen at moment T+1 and is associated with a first predicted point, the first predicted point being a point predicted by the processor for the moment T+1 according to a first touch trajectory, the first touch trajectory being a trajectory generated by the processor at moment T and being one of at least one touch trajectory, and the at least one touch trajectory being in a one-to-one correspondence with the at least one touch point sequence, where T is an integer;

obtaining, by the processor, at least one predicted point sequence that comprises a first predicted point sequence comprising Q predicted points, the Q predicted points being associated with a first actual touch point, the first actual touch point being one of the plurality of actual touch points, and at least one of the actual touch points being in a one-to-one correspondence with the at least one predicted point sequence, where Q is a non-negative integer; and matching, by the processor, the actual touch points in the at least one touch point sequence with the predicted points in the at least one predicted point sequence by a deferred-acceptance algorithm to obtain a matching result.

11. The method for obtaining a touch trajectory according to claim 10, further comprising:

obtaining, by the processor, at least one actual touch point collected at each of moments T+2 to T+N when the matching result comprises an unmatched touch point through the touch screen, where N is a positive integer greater than 2, the unmatched touch point is a point in the actual touch points collected at moment T+1, and the unmatched touch point is not matched with the touch trajectory;

determining, by the processor, a newly added target actual touch point that is matched with the unmatched touch point among at least one actual touch point collected at each of the moments T+2 to T+N; and generating, by the processor, a newly added touch trajectory based on the unmatched touch point and the newly added target actual touch point.

12. An obtaining device for a method for matching touch points, integrated into an electronic apparatus which comprises a touch screen and a processor coupled to the touch screen, and comprising:

a first obtaining module integrated into the touch screen and the processor, and configured to obtain at least one touch point sequence that comprises a first touch point sequence, the first touch point sequence comprising at least one effective actual touch point which is a point of a plurality of actual touch points detected at moment T+1 and is associated with a first predicted point, the first predicted point being a point predicted for the moment T+1 according to a first touch trajectory, the first touch trajectory being a trajectory generated at moment T and being one of at least one touch trajectory, and the at least one touch trajectory being in one-to-one correspondence with the at least one touch point sequence, where T is an integer;

a second obtaining module integrated into the touch screen and the processor, and configured to obtain at least one predicted point sequence that comprises a first predicted point sequence comprising Q predicted points, the Q predicted points being associated with a first actual touch point, the first actual touch point being one of the plurality of actual touch points, and the at least one actual touch point being in one-to-one correspondence with the at least one predicted point sequence, where Q is a non-negative integer; and a first determining module integrated into the processor and configured to match the actual touch points in the at least one touch point sequence with the predicted points in the at least one predicted point sequence by a deferred-acceptance algorithm to obtain a matching result.

13. The device according to claim 12, wherein the at least one effective actual touch point being associated with a first predicted point comprises: a Euclidean distance between any one of the at least one effective actual touch point and the first predicted point being less than or equal to a predetermined distance threshold; and the Q predicted points being associated with the first actual touch point comprises: a Euclidean distance between any one of the Q predicted points and the first actual touch point being less than or equal to the distance threshold.

14. The device according to claim 13, wherein the first obtaining module is further configured to make a prediction based on the first touch trajectory to obtain the first predicted point, to obtain the plurality of actual touch points, to determine a Euclidean distance between any one of the plurality of actual touch points and the first predicted point; and to arrange the actual touch points whose Euclidean distances are less than or equal to the distance threshold in an ascending order of the Euclidean distances to obtain the first touch point sequence; and wherein the second obtaining module is further configured to obtain the first actual touch point, to determine a Euclidean distance between any one of the at least one predicted point and the first actual touch point, where the at least one predicted point is in one-to-one correspondence with the at least one predicted trajectory; and arrange the predicted points whose Euclidean distances are less than or equal to the distance threshold, in ascending order of the Euclidean distances, to obtain the first predicted point sequence.

15. The device according to claim 12, wherein the matching result comprises at least one set of matching relationships which comprises a first matching relationship, the first matching relationship being a relationship in which a first effective actual touch point is matched with a second touch trajectory each other, the first effective actual touch point being one of the at least one effective actual touch point, and the second touch trajectory being one of the at least one touch trajectory.

16. The device according to claim 15, wherein the matching result further comprises an unmatched touch point, which is a point of the at least one actual touch point and is not matched with any of the at least one touch trajectory.

17. The device according to claim 12, wherein the deferred-acceptance algorithm is the Gail Shapley GS algorithm.

18. A device for obtaining a touch trajectory, integrated into an electronic apparatus comprising a touch screen and a processor coupled to the touch screen, and comprising:

an obtaining module integrated into the touch screen and the processor, and configured to obtain a touch trajectory generated at moment T;

a first determination module integrated into the processor and configured to determine a target actual touch point that is matched with the touch trajectory by using an obtaining device for a method for matching touch points according to claim 12, the target actual touch point being one of the actual touch points detected at moment T+1; and a second determining module integrated into the touch screen and the processor, and configured to generate an updated touch trajectory based on the touch trajectory and the target actual touch point.

19. The device according to claim 18, further comprising:

a second obtaining module integrated into the touch screen and the processor, and configured to obtain at least one actual touch point collected at each of moments T+2 to T+N when the matching result comprises an unmatched touch point, wherein N is a positive integer greater than 2, the unmatched touch point is a point of the actual touch points collected at moment T+1 and is not matched with the touch trajectory;

a third determination module integrated into the processor and configured to determine a newly added target actual touch point that is matched with the unmatched touch point from the at least one actual touch point collected at each of the moments T+2 to T+N by using the method for matching touch points; and a first generation module integrated into the touch screen and the processor, and configured to generate a newly added touch trajectory based on the unmatched touch point and the newly added target actual touch point.

\* \* \* \* \*